Nov. 5, 1957 C. H. HUGHES 2,812,291
BROAD OVEN FOR TREATING ACID HYDROCARBON SLUDGES
Filed Dec. 4, 1952 5 Sheets-Sheet 1
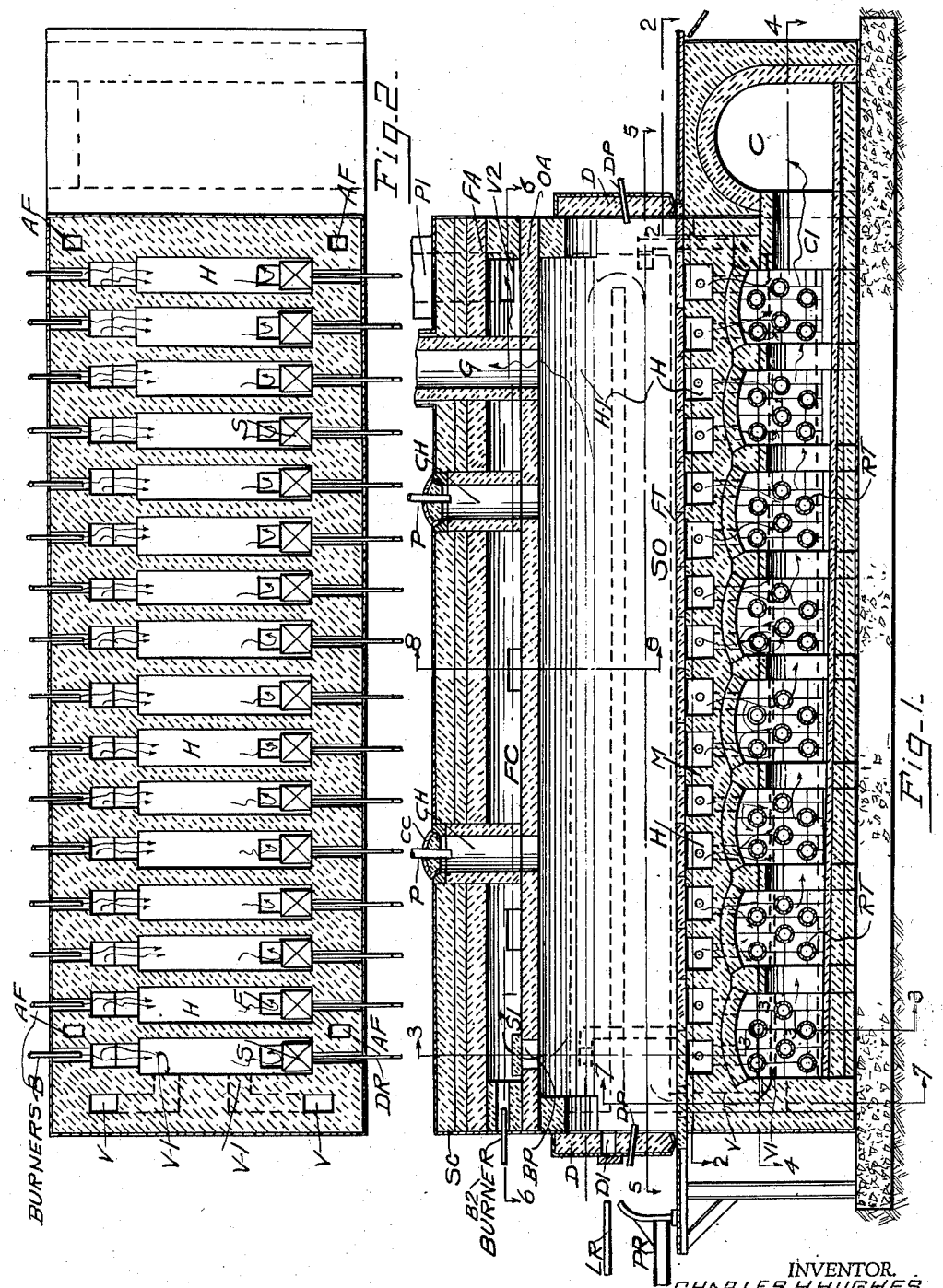
INVENTOR.
CHARLES H. HUGHES
BY A. M. Deller
ATTORNEY Nov. 5, 1957 C. H. HUGHES 2,812,291
BROAD OVEN FOR TREATING ACID HYDROCARBON SLUDGES
Filed Dec. 4, 1952 5 Sheets-Sheet 2

INVENTOR
CHARLES H. HUGHES
BY
ATTORNEY

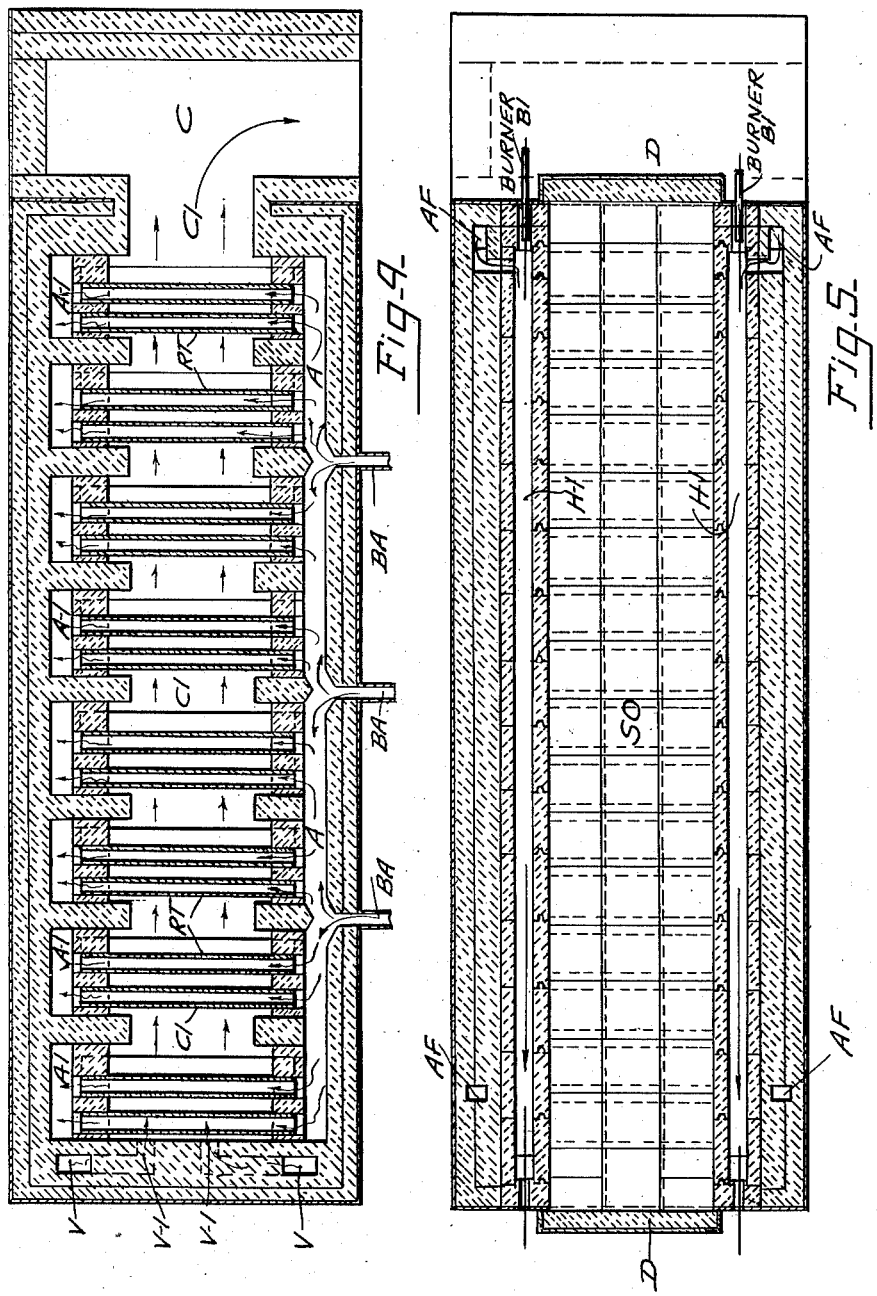

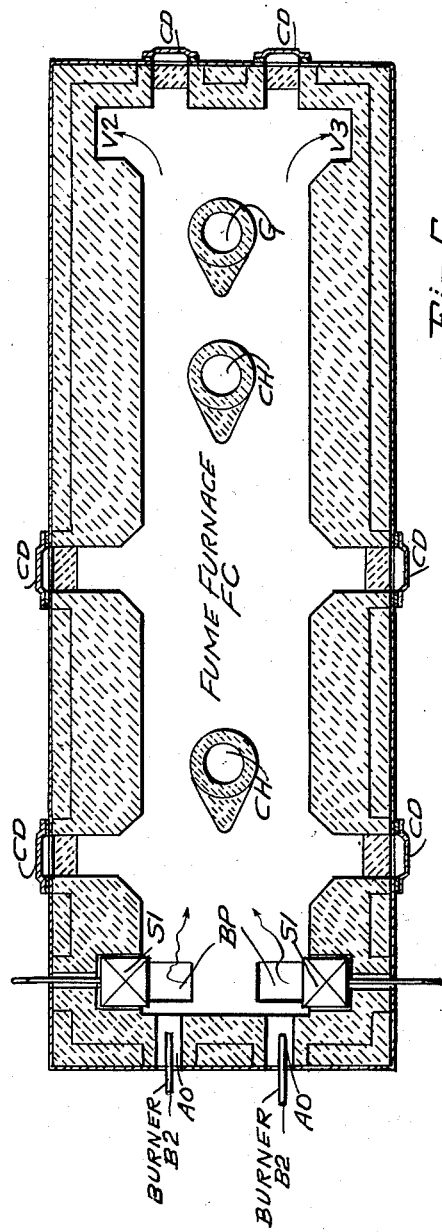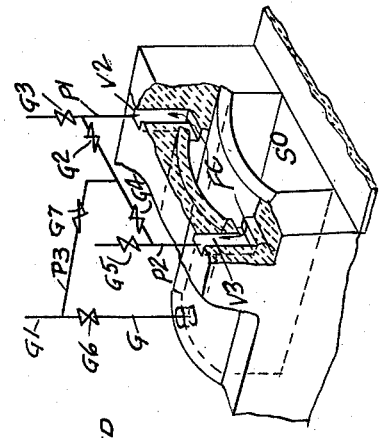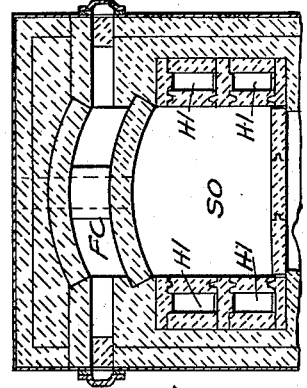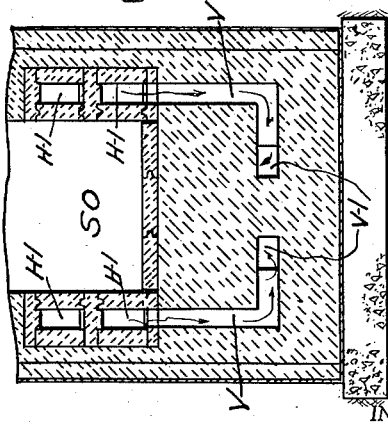

United States Patent Office 2,812,291
Patented Nov. 5, 1957

2,812,291

BROAD OVEN FOR TREATING ACID HYDROCARBON SLUDGES

Charles H. Hughes, Glen Ridge, N. J., assignor to Hughes By-Product Coke Oven Corporation, New York, N. Y., a corporation of New York Application December 4, 1952, Serial No. 323,997

8 Claims. (Cl. 202—101)

The present invention relates to the art of treating acid-hydrocarbon sludges, and, more particularly, to an improved oven for thermally treating acid sludge to dispose of a nuisance or to produce not only oxides of sulfur in a condition suitable for use in the production of sulfuric acid, when desired, but also carbonaceous materials including coke which may be suitable for household and industry and hydrocarbon products.

It is well known to the art that the disposal of acid sludge produced as a by-product in the refining of petroleum, of aromatic products like benzol, and of other hydrocarbon products, such as tar, pitch, and the like, has constituted a difficult and vexatious problem. As those skilled in the art are well aware, acid sludge is a complex mass containing free sulfuric acid, mahogany acids, sulfonic products, hydrocarbons including tarry and oily residues, carbonaceous aggregates, etc. Although acid sludge contains valuable products, nevertheless, it was the practice in many industrial plants to dispose of it as a waste material in rivers, bays and other bodies or streams of water. Various states and communities have enacted laws and ordinances prohibiting the disposal of acid sludge in water ways, sewage systems, etc. Industries producing acid sludge, which is highly acid, viscous, sticky and variable in composition, have been confronted with the pressing problem of disposing of it and of endeavoring to recover valuable constituents, when desired. In recent years, the problem has received considerable attention by the industries involved as well as equipment and chemical companies and various publications have discussed the serious nature of the problem. (For instance, see article entiled "Disposal of Sludge from Acid Washing of Coke-Oven Light Oil," by Elliott Preston, published in Blast Furnace and Steel Plant for January 1946.) The author states that, "The problem is clearly revealed by the fact that in disposing of sludge the method most universally adopted in this country is that of dumping it in a hole as far away from human activity as possible. Industrial plants as well as residential sections grow and many areas that were once suitable for waste dumps now come within range of people's activities and fall within the scope of municipal ordinances that are becoming increasingly strict. Moreover, even the good holes eventually fill up." Preston has pointed out that dumping the acid sludge has been a common practice to get rid of the troublesome waste material. In some instances, burning has been resorted to by various industries producing acid sludge. The design of appropriate burners and the handling of the acid sludge during burning operations has presented further difficulties. When the acid sludge is burned, the waste gases are contaminated with sulfur dioxide which means the establishment of nuisance in a neighborhood even if high stacks and chimneys were used. To avoid the difficulties of dumping and washing, it has been proposed to subject acid sludge to a washing operation with a large quantity of water, usually about twice the volume of acid used originally in treating the hydrocarbon, such as petroleum, oil, tar, benzol, naphtha and the like. It has been suggested that the wash water containing the acid removed from the sludge might be used in the ammonia saturators even though the acid water is discolored. As is readily appreciated, washing acid sludge has limited applicability and involves the use of cumbersome apparatus and the availability of ammonia saturators. Other attempts of disposing of acid sludge include various processing operations. These processing operations have been mainly concerned with the recovery of sulfuric acid. One of the general types of processing operation is the separation of acid from the hydrocarbons as a separate phase and the subsequent recovery of the separated acid. Another general type of process is the burning of acid sludge to sulfur dioxide and reconverting it to sulfuric acid in a conventional acid plant. Although a great variety of proposals and attempts have been made for the disposal of acid sludge, nevertheless, none has been wholly satisfactory and universally applicable and the art is still confronted with the nuisance problem.

It is an object of the invention to provide a unique combination oven with a fume chamber located directly above the arch over the coking chamber and within the same steel encased structure into which all of the acid vapors and hydrocarbon gases may be conducted where the hydrocarbon gases will be burned.

The invention likewise contemplates the provision of an improved oven in which the acid vapors and products of combustion pass out of the fume chamber and into pipes connecting the fume chamber of the combination coking oven with a sulfuric acid recovery plant or washing or other suitable equipment as required.

A further object of the invention is to provide a novel broad coking oven containing a special combination of structural elements including a cross heating flue system under the floor of the oven whereby the heating of separate sections of the oven floor will provide for controllable temperatures as required depending upon the quantity and nature of liquid materials over certain floor areas of the oven.

It is also within the contemplation of the invention to provide for the direct flow of all vapors to the sulfuric acid plant or washing equipment without passing through the fume chamber.

Other objects and advantages of the present invention will be described in conjunction with a preferred embodiment of the novel combination oven and fume chamber which is illustrated in the accompanying drawings, in which:

Fig. 1 represents a vertical longitudinal section of the novel coking oven including the tubular recuperators for preheating air for cumbustion and the vapor fume chamber;

Fig. 2 is a sectional plan view through the heating flues under the oven floor taken on line 2—2 of Fig. 1.

Fig. 4 shows a plan section through the tubular recuperators and chimney flue taken on the line 4—4 of Fig. 1;

Fig. 5 depicts a plan section through the oven and side heating flues taken on line 5—5 of Fig. 1;

Fig. 6 is a plan section through the fume chamber charging holes and vapor off-take taken on line 6—6 of Fig. 1;

Fig. 7 represents a vertical section through the oven and oven side heating flues showing the waste heat flues connecting the side heating flues with the recuperator chamber around the recuperator tubes taken on line 7—7 of Fig. 1;

Fig. 8 illustrates a vertical section through the oven fume chamber and clean-out doors in the fume chamber taken on Fig. 1;

Fig. 9 depicts a fragmentary and broken-away view of the oven and fume chamber showing the arrangement of piping interconnecting the oven and fume chamber with a sulfuric acid plant or scrubbing or other suitable equipment (not shown)

Figure 3:
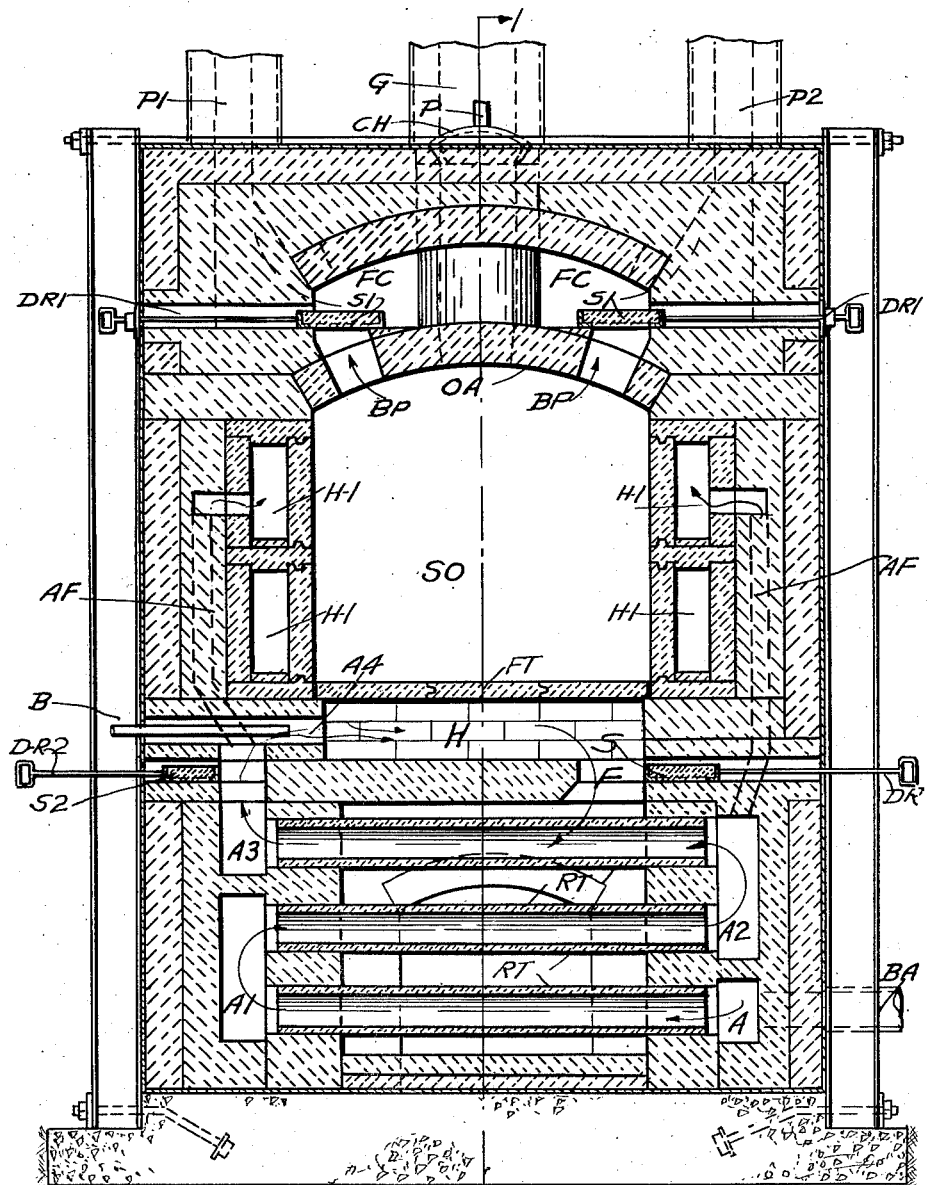
Fig. 3 illustrates a vertical cross section through the novel oven, recuperators and fume chamber taken on line 3—3 of Fig. 1.

Generally speaking, the present invention contemplates the provision of a method involving a novel combination of operations including vaporizing of substantially all of the liquids contained in the acid sludge as quickly as possible and at as high a temperature as practically possible, heat treating the vapors for the removal of hydrocarbon gases, and coking the carbon residues remaining after the final gasing off from the oven of all vapors and gases. For carrying the improved method into practice, the invention likewise contemplates providing an improved broad oven and fume chamber combination having special design features including a novel broad coking oven heated, from below, along both sides, and from the top by means of special heating flues separately controlled and employing the sensible heat in the products of combustion for preheating the air required for combustion in the heating flues under the floor of the oven and side wall heating flues.

Referring to the drawings, the novel sludge oven SO has charging ports CH through which the acid sludge is charged into the oven and has a fume chamber FC in which hydrocarbon gases are burned. In the roof of the oven, port G is provided through which the vapors may be taken direct to an acid recovery plant (not shown). Floor heating flues H are incorporated directly under the floor of the oven and side wall heating flues H-1 are located in each of the side walls of the oven. Underneath the entire oven and associated heating flues, tubular recuperators RT are provided for preheating air required for combustion of fuel in the heating flues. From Figs. 1 and 3, it will be noted that the coking chamber of the sludge oven SO is longer than it is wide and is slightly wider than it is deep. Each end of the extended broad sludge oven is closed with a removable door D.

The novel sludge oven has a vaulted roof arch OA and the fume chamber has a vaulted roof FA as may be clearly seen from Fig. 3. The floor of the coking chamber of the sludge oven consists of a series of tongue and groove tiles FT made of silicon carbide refractory material. These tiles are supported by pier walls M composed of an acid proof refractory material. In walls M heating flues H are incorporated which extend cross-wise of the coking chamber. Due to this special construction, the oven floor is subjected across the entire width to substantially the same heating effect as required or the floor heating may be varied as required along the entire length of the coking chamber. Beneath arch FA in the roof of the oven and directly above arch OA over the coking chamber is located the fume chamber FC. The oven SO is connected with fume chamber by the by-pass ports BP which may be closed or opened by slides SI. Pipe P passing through charging hole covers CC and into charging ports CH are used for admitting or introducing acid sludge, fluids, gases, vapors, steam, and tar and tar sands into the coking chamber. Pusher PR is provided for pushing coke from the oven into a coke car. A leveling ram LR is constructed on the coke pusher and is used for arranging the solid materials in the acid sludges at approximately a common level. Opening D-1 is provided in door D for entrance of leveling ram LR.

Referring more particularly to Fig. 3, it may be seen that there are two by-pass flues BP and two damper slides S1 whereby an even flow of fumes and vapors from the coking oven SO into the fume chamber FC is insured. The slide dampers S1 are moved by the use of the hand operated damper rods DR-1.

At each side of the coking oven there are two series connected heating flues H-1. These heating flues are constructed of silicon carbide refractory material, the same as the floor of the oven. Preheated air is conducted upward to the heating flues H-1 from flues A-2 and A-3 through vertical air flues AF. At the outer end of each heating flue H is a gas or oil burner B. The flow of products of combustion from heating flues H is regulated by slide dampers S by means of hand-operated damper rod DR.

Air required for combustion enters through pipes BA into longitudinal flue A then through silicon carbide refractory tubes RT to hot air flues A-1, A-2, and A-3 around burner pipe B. The flow of air to the burner is regulated by slide damper S-2 operated by hand damper rod DR-2.

Figure 10:
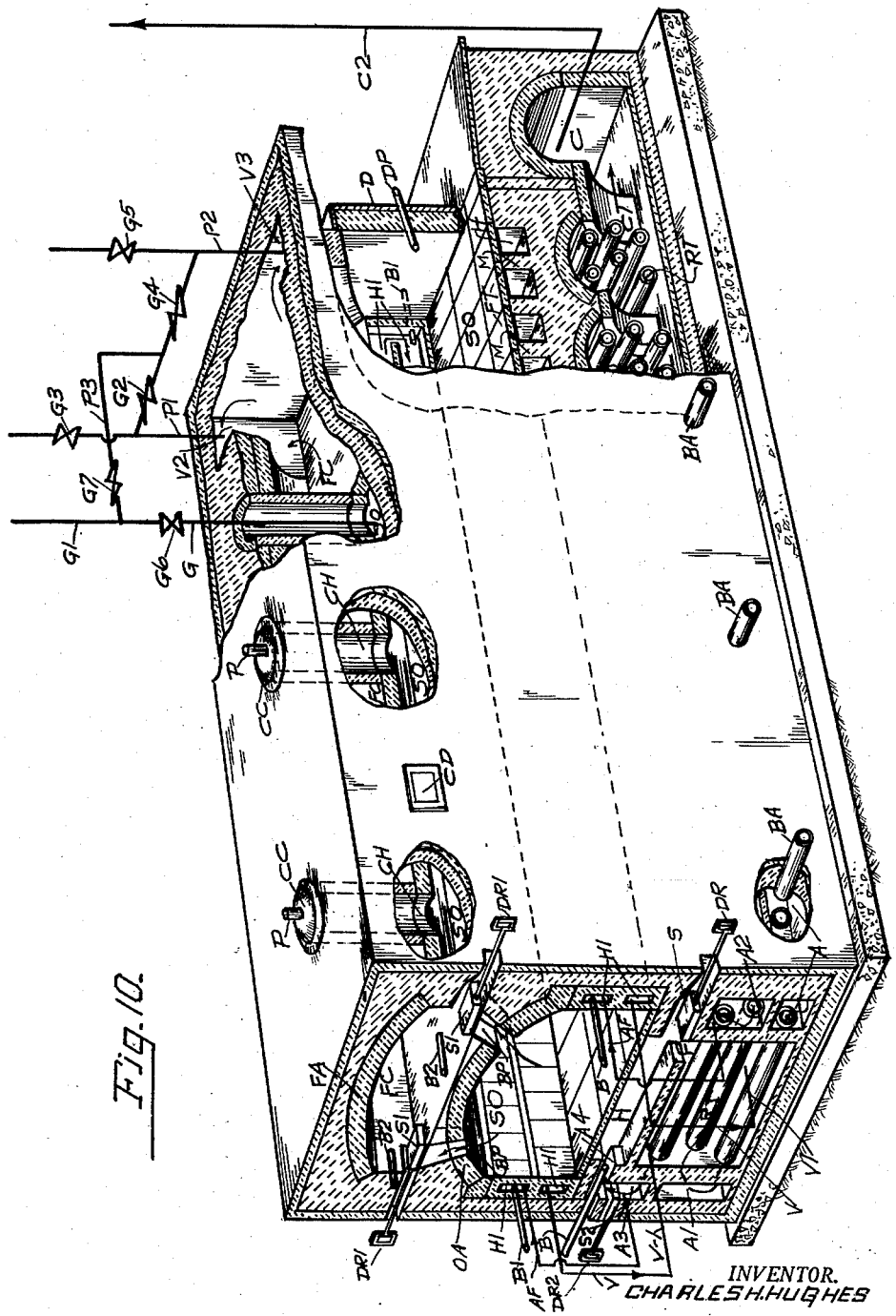
Fig. 10 is a perspective view, partly broken away and in section, of a schematic outline of the novel oven showing essential units.

In Fig. 4, air pipes BA show the manner in which air enters flue A and flows through the recuperator tubes RT to hot air flue A-1. The arrows point the direction of flow of the waste hot flue gases or products of combustion through flues C-1 into the common chimney flue C to stack C-2 (see Fig. 10). Vertical flues marked V and V-1 (see Figs. 2, 7, and 10) are used for conducting the waste gases from oven heating flues H-1 (Fig. 3) into the space around the tubular recuperators RT.

In Fig. 5, oven heating flues H-1 and hot air flues AF and burners B-1 are clearly shown. The horizontal heating flues are located in each side of the oven (see Fig. 3) and extend from the oven floor FT to the oven arch OA. These flues are constructed of silicon carbide refractory material to provide rapid transfer of heat into the acid sludge throughout the full depth of the sludge in the oven. Oil and tarry vapors contacting the hot flue surfaces are cracked into aromatic gases which are readily burned with other hydrocarbon gases in the fume chamber. Heat is supplied to the heating flues by burning gas, oil, or tar as fuel. The silicon carbide not only transmits the heat rapidly but also withstands the abrasive action of pusher ram PR (see Fig. 1) when pushing the coke from the oven.

In Fig. 6, the entrance to the exit flues V-2 and V-3 is shown through which fumes, gases, and vapors pass to the piping (see Figs. 9 and 10) and then to an acid recovery plant or scrubbing or other suitable equipment (not shown). In this plan section, openings or connectors BP are shown connecting the fume chamber FC with coking oven SO. Slide dampers S-1 are provided to close or open connectors BP whenever it is desired to have the vapors from the oven SO pass through flue G directly to a sulfuric acid plant. Burners B-2 are used for igniting the hydrocarbon gases flowing upward through flues BP from the oven SO into the fume chamber. The sensible heat in the waste gases generated by the burners keeps the temperature of the vapors above the condensing temperature.

In Fig. 7, the heating flues H-1 and waste gas flues V and V-1 are shown connecting the heating flues H-1 with the recuperator chamber under the oven and around the tubular recuperators RT. This view shows a vertical section through the two horizontal heating flues which form both sides of the oven. The waste hot gases from the heating flues are conducted through waste gas flues V and V-1 into the recuperator chamber around the tubular recuperator tubes of the first tube assembly at the pusher end of the oven as shown in Fig. 1 and diagrammatically in Fig. 10. The hot waste gases entering the recuperator chamber around the tubes in the first tube assembly mix with the waste gases from floor heating flues H (see Figs. 1, 2, 3, and 10) and flow around all of the tubes in the other recuperator tube assemblies through flue C-1 to flue C thence to stack C-2 (see Fig. 10).

In Fig. 8, the clean-out doors CD are shown which are located in each side and at the ends of the fume chamber (see also Fig. 6). The ash from burning the hydrocarbon gases and entrained coke particles may be removed as required through clean-out doors CD.

In the operation of the sludge oven, the bottom and sides of the oven are heated. Oven doors D are closed and luted in such a manner as to exclude the air from the coking chamber SO and to prevent the flow of liquids from the coking chamber. The covers CC are removed and the acid sludge is charged into the oven SO through charging holes CH. The covers CC are then replaced and sealed. When heavy residue charged into the oven is deposited unevenly, then door D-1 is opened and the leveling ram LR is run into the oven and a common level established for the sludge. The ram is withdrawn and D-1 closed.

The coking process and vaporization of the acid sludge is started by increasing the volume of gas burned in heating flues H and H-1.

The vapors evolved may pass off through opening G direct to the sulfuric acid plant or scrubbers or any suitable equipment. The common practice will be to open slides S-1 and permit the vapors to enter the fume chamber FC. Air for combustion in the fume chambers will be admitted through the openings AO around burners B-2 to ignite the hydrocarbon gases entrained in the sulfuric acid vapors. The flow of vapors may be clearly seen by referring to Fig. 10.

With the slide dampers S-1 (Fig. 1 and Fig. 10) closed and valve G-6 (Fig. 10) open, the vapors from oven SO flow upward through pipe G-1 to the sulfuric acid plant or scrubbers, etc. In order to burn the hydrocarbon gases in the vapors, valves G-2, G-4, and G-7 are open and valve G-6 is closed, then the vapors flow from the fume chamber FC upward through openings V-2 and V-3 through pipes P-1 and P-2 and P-3 into pipe G-1 to a sulfuric acid plant, etc. In the event that the fumes are to be vented to the atmosphere through high stacks, valves G-3 and G-5 are opened and valves G-2, G-4 and G-6 are closed.

During the coking process, it may be necessary to dilute the acid vapors by the use of steam in which case some suitable gas or vapor, such as waste gases, flue gases, nitrogen, steam, etc., will be admitted into the coking chamber SO through pipes P extending through the charging hole covers CC or through pipes DP extending into the oven through the oven doors D.

In case a tar or residue oil binder is required for improving the coke structure of the sludge coke residue, the binders can be sprayed into the coking chamber over the top surface of the carbon residue through pipes P and DP.

It is to be observed that the present invention provides a method for the disposal of acid sludge in a novel coke oven. As those skilled in the art will appreciate from the foregoing description, the novel acid sludge oven can be readily operated by operators familiar with the operations of broad coke ovens, such as those disclosed in my U. S. Patents Nos. 2,486,413 and 2,426,612 and my pending U. S. patent application, Serial No. 150,052 now U. S. Patent No. 2,640,805. After closing and sealing the oven doors, acid sludge is charged through charging holes provided in the oven roof. Sufficient fuel is burned in the burners to volatilize all of the gases and vapors in the sludge and to vaporize all of the liquid present. It is preferred to adjust the burners and to operate them to give as high a temperature as is possible and appropriate under each circumstance. Usually, these burners will produce a temperature of about 2400° F. in the oven floor. In some instances, these vapors may be so heavy that they will require the addition of a suitable hot vapor and/or gases, such as waste gases, nitrogen, steam, etc., to thin them. By supplying such diluent gases and/or vapors in sufficient volume to the oven space above the sludge, the evolved vapors and gases are caused to be drawn freely from the oven. The period of heating the sludge to drive off all of the vapors and gases and to volatilize all of the liquids will vary from batch to batch of sludge and from plant to plant. In general, however, it is preferred to use as high a temperature as is practical to remove all of the vapors, gases and liquids as quickly as possible. Following the removal of such vapors, gases and liquids, the heating of the residual solids is continued until all of the solids are converted into hard lumps or granules. For convenience, these hard lumps or granules will be considered as coke. Upon complete conversion or treatment of the acid sludge, the red hot coke having a temperature of about 1850° F. can be pushed as quickly as possible from the oven directly to the atmosphere and into a quench car, for example. The pushed coke can then be handled in the usual manner. Generally, the foregoing operations may take from about six hours to about twelve hours.

During the heating of the acid sludge, particularly where a large volume of masses of hydrocarbons are present, it often happens that a combustible gas will be present in sufficient volume to be burned. In such instances, the combustible gas may be burned in the fume chamber. Sufficient air is admitted to the fume chamber to effect such combustion as will be understood by those skilled in the art.

The vapors, etc., coming from the fume chamber containing oxides of sulfur may be used in the manufacture of sulfuric acid. Generally, however, the vapors are scrubbed of all sulfurous or detrimental components and the residual vapors and gases are vented to the atmosphere via suitable means, such as a high stack. The so-called coke may have a value as boiler or domestic fuel or as coke solids in industry.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An improved broad oven for thermally treating acid sludge to produce not only oxides of sulfur in a condition suitable for use in the production of sulfuric acid but also carbonaceous materials including coke suitable for industry which comprises an elongated rectangular coking oven of the broad type having a flat floor and capable of being sealed against air, a heating flue system associated with said oven to supply heat to evolve gases and vapors containing hydrocarbons and oxides of sulfur from said acid sludge while coking carbonaceous residue, said heating system comprising cross heating flues located directly under the floor of the oven to provide controllable temperatures required for various floor areas throughout the length of the oven and side heating flues located in each side wall of the oven whereby sufficient heat is provided to produce as high a temperature as possible to vaporize substantially all liquids, vapors and gases in said acid sludge including hydrocarbons and oxides of sulfur and to coke any carbonaceous residue remaining after the final gassing off of substantially all vapors and gases, a heat exchange unit associated with said heating flues to transfer heat from outgoing hot burnt products of combustion to incoming air whereby preheated air is produced for supporting combustion in said heating flues, a vaulted arch over the entire upper part of the oven, a vaulted roof located directly over said arch and spaced therefrom to provide a fume chamber, a plurality of ports in said arch to directly connect said oven to said fume chamber, at least one burner and associated air port communicating with said fume chamber to provide heat and air inside of the same in order to burn hydrocarbon vapors and gases vaporized from acid sludge under treatment in said oven and to produce burnt products of combustion, and an outlet port associated with said fume chamber for the withdrawal of gases and vapors containing oxides of sulfur and burnt products of combustion.

2. An improved broad oven for thermally treating acid sludge to produce not only oxides of sulfur in a condition suitable for use in the production of sulfuric acid but also carbonaceous materials including coke suitable for industry which comprises an elongated rectangular coking oven of the broad type having a flat floor made of silicon carbide and being longer than wide and slightly wider than deep, a removable door provided at each end of said oven and capable of sealing said oven against air, a heating flue system associated with said oven to supply heat to evolve gases and vapors containing hydrocarbons and oxides of sulfur from said acid sludge while coking carbonaceous residue, said heating system comprising cross heating flues made of silicon carbide and located directly under the floor of the oven to provide controllable temperatures required for certain floor areas of the oven and side heating flues made of silicon carbide and located in each side wall of the oven whereby sufficient heat is provided to produce as high a temperature as possible to vaporize substantially all liquids, vapors and gases in said acid sludge including hydrocarbons and oxides of sulfur and to coke any carbonaceous residue remaining after the final gassing off of substantially all vapors and gases, a burner provided in each of said flues, a heat exchange unit associated with said heating flues to transfer heat from outgoing hot burnt products of combustion to incoming air whereby preheated air is produced for supporting combustion in said heating flues, a vaulted arch over the entire upper part of the oven, a vaulted roof located directly over said arch and spaced therefrom to provide a fume chamber, a plurality of ports in said arch to directly connect said oven to said fume chamber, at least one burner and associated air port communicating with said fume chamber to provide heat and air inside of the same in order to burn hydrocarbon vapors and gases vaporized from acid sludge under treatment in said oven and to produce burnt products of combustion, and an outlet port associated with said fume chamber for the withdrawal of gases and vapors containing oxides of sulfur and burnt products of combustion.

3. An improved broad oven for thermally treating acid sludge to produce not only oxides of sulfur in a condition suitable for use in the production of sulfuric acid but also carbonaceous materials including coke suitable for industry which comprises an elongated rectangular coking oven of the broad type having a flat floor and capable of being sealed against air, said oven being longer than wide and slightly wider than deep, a heating flue system associated in said oven to supply heat to evolve gases and vapors containing hydrocarbons and oxides of sulfur from said acid sludge while coking carbonaceous residue, said heating system comprising cross heating flues located directly under the floor of the oven to provide controllable temperatures required for various floor areas throughout the length of the oven and side heating flues located in each side wall of the oven whereby sufficient heat is provided to produce as high a temperature as possible to vaporize substantially all liquids, vapors and gases in said acid sludge including hydrocarbons and oxides of sulfur and to coke any carbonaceous residue remaining after the final gassing off of substantially all vapors and gases, a tubular recuperator associated with said heating flues to transfer heat from outgoing hot burnt products of combustion to incoming air whereby preheated air is produced for supporting combustion in said heating flues, a vaulted arch over the entire upper part of the oven, a vaulted roof located directly over said arch and spaced therefrom to provide a fume chamber, a plurality of ports in said arch to directly connect said oven to said fume chamber, at least one burner and associated air port communicating with said fume chamber to provide heat and air inside of the same in order to burn hydrocarbon vapors and gases vaporized from acid sludge under treatment in said oven and to produce burnt products of combustion, and an outlet port associated with said fume chamber for the withdrawal of gases and vapors containing oxides of sulfur and burnt products of combustion.

4. An improved broad oven for thermally treating acid sludge to produce not only oxides of sulfur in a condition suitable for use in the production of sulfuric acid but also carbonaceous materials including coke suitable for industry which comprises an elongated rectangular coking oven of the broad type having a flat floor made of silicon carbide and being longer than wide and slightly wider than deep, a removable door provided at each end of said oven and capable of sealing the oven against air, a heating flue system associated with said oven to supply heat to evolve gases and vapors containing hydrocarbons and oxides of sulfur from said acid sludge while coking carbonaceous residue, said heating system comprising cross heating flues made of silicon carbide and located directly under the floor of the oven to provide controllable temperatures required for various floor areas throughout the length of the oven and side heating flues made of silicon carbide and located in each side wall of the oven whereby sufficient heat is provided to produce as high a temperature as possible to vaporize substantially all liquids, vapors and gases in said acid sludge including hydrocarbons and oxides of sulfur and to coke any carbonaceous residue remaining after the final gassing off of substantially all vapors and gases, a burner provided in each of said flues, a recuperator containing a plurality of silicon carbide tubes and associated with said heating flues to transfer heat from outgoing hot burnt products of combustion to incoming air whereby preheated air is produced for supporting combustion in said heating flues, a vaulted arch over the entire upper part of the oven, a vaulted roof located directly over said arch and spaced therefrom to provide a fume chamber, a plurality of ports in said arch to directly connect said oven to said fume chamber, a plurality of burners and associated air ports communicating with said fume chamber to provide heat and air inside of the same in order to burn hydrocarbon vapors and gases vaporized from acid sludge under treatment in said oven and to produce burnt products of combustion and to keep the temperature of said fume chamber above the condensing temperature of said vapors, and an outlet port associated with said fume chamber for the withdrawal of gases and vapors containing oxides of sulfur and burnt products of combustion.

5. An improved broad oven for thermally treating acid sludge to produce not only oxides of sulfur in a condition suitable for use in the production of sulfuric acid but also carbonaceous materials including coke suitable for industry which comprises an elongated rectangular coking oven of the broad type having a length longer than its width and a width slightly greater than its depth and having a flat floor made of silicon carbide tiles to be maintained at floor temperatures of about 2400° F., a removable door provided at each end of said oven and capable of sealing the oven against air, charging means provided in said oven for charging acid sludge, a heating flue system associated with said oven to supply heat to evolve gases and vapors containing hydrocarbons and oxides of sulfur from said acid sludge while coking any carbonaceous residue to a red hot coke having a temperature of about 1850° F., said heating system comprising cross heating flues made of silicon carbide and located directly under the floor of the oven to provide controllable temperatures required for various floor areas thoughout the length of the oven and side heating flues made of silicon carbide and located in each side wall of the oven whereby sufficient heat is provided to produce as high a temperature as possible to vaporize substantially all liquids, vapors and gases in said acid sludge including hydrocarbons and oxides of sulfur and to coke any carbonaceous residue remaining after the final gassing off of substantially all vapors and gases, a damper provided in each flue for controlling the flow of gases therethrough including air, fuel and products of combustion, a burner provided in each of said flues, a recuperator containing a plurality of silicon carbide tubes and associated with said heating flues to transfer heat from outgoing hot burnt products of combustion to incoming air whereby preheated air is produced for supporting combustion in said heating flues, a common chimney flue connected to said recuperator and leading to a stack to cause a flow of hot gases through said heating flues and around the silicon tubes in said recuperator as they pass to said stack, a vaulted arch constructed over the entire upper part of the oven and made of a refractory material capable of being heated to temperatures high enough to crack oil and tarry vapors from said acid sludge, a vaulted refractory roof located directly over said arch and spaced therefrom to provide a fume chamber, a plurality of ports in said arch to directly connect said oven to said fume chamber, a plurality of burners and associated air ports communicating with said fume chamber to provide heat and air inside of the same in order to burn hydrocarbon vapors and gases vaporized from acid sludge under treatment in said oven and to produce burnt products of combustion and to keep the temperature of said fume chamber above the condensing temperature of said vapors, and an outlet port associated with said fume chamber for the withdrawal of gases and vapors containing oxides of sulfur and burnt products of combustion.

6. An improved broad oven of the character set forth in claim 5 which is provided with means for introducing diluent gases, vapors and steam to the oven.

7. An improved broad oven of the character set forth in claim 5 which is provided with means for spraying a fluid binder of the group consisting of tar and oily residue into the oven to improve the quality of the coke.

8. An improved broad oven of the character set forth in claim 5 which is provided with a vent capable of venting the gases and vapors from the oven directly to the chimney stack.

References Cited in the file of this patent

UNITED STATES PATENTS

| | | |
|---|---|---|
| 852,506 | Hamlink | May 7, 1907 |
| 956,184 | Schildhaus | Apr. 26, 1910 |
| 1,384,149 | Piron | July 12, 1921 |
| 1,535,656 | Egloff | Apr. 28, 1925 |
| 1,758,544 | VonAckeren | May 13, 1930 |
| 1,953,225 | Heckenblukner | Apr. 3, 1934 |
| 2,309,957 | Hughes | Feb. 2, 1943 |
| 2,393,214 | Andrews | Jan. 15, 1946 |
| 2,426,612 | Hughes | Sept. 2, 1947 |
| 2,640,805 | Hughes | June 2, 1953 |